Patented Dec. 20, 1927.

1,653,138

UNITED STATES PATENT OFFICE.

JOHANNES CLAZINUS MARIE VAN DIGGELEN, OF AMSTERDAM, NETHERLANDS, ASSIGNOR TO NAAMLOOZE VENNOOTSCHAP: OCTROOI MAATSCHAPPIJ "VEDE," OF AMSTERDAM, NETHERLANDS, A CORPORATION OF THE NETHERLANDS.

PROCESS FOR THE MANUFACTURE OF A TEXTILE MATERIAL FROM VEGETABLE RAW MATERIAL.

No Drawing. Application filed October 11, 1926, Serial No. 141,030, and in the Netherlands April 29, 1924.

My invention relates to a process for the manufacture of a textile material which may also be used as an elastic filler from vegetable raw material.

Several methods are known in which vegetable fibrous material is liberated from raw vegetable material and in which methods caustic alkali solutions are used. In these processes the elasticity of the fibres and fibrous aggregates is very little if any and this material therefore does not constitute a sufficiently spinnable product. It has been proposed to obtain the desired elasticity by "soaping" the liberated fibres, that is by dipping the fibres into a soap solution, but this treatment has not given satisfactory results. The same holds true for subsequent treatment of the fibres with oils or fats. In this and similiar processes the alkali solution is always removed from the fibres for instance by washing before the oil—or soap—treatment takes place.

According to my invention the vegetable fibres raw material is liberated, if desired whilst heating, with alkaline solutions, for instance sodium hydroxide, if necessary with the addition of solutions of salts of the heavy metals, such as $CuSO_4$, $NiSO_4$ and a solution of ammonium chloride as catalysts (see my U. S. Patent 1,189,756), after which without removing the alkali solution from the fibres, the fibres, wet with caustic alkali solution, are treated with fatty acids, fats, or emulsions of fatty acids or fats in water. By this process, the caustic alkali remaining on the fibers reacts with the fatty acid or fat to form soap in situ as a result, a fibrous product is obtained which meets all requirements for a well-spinnable and weavable material.

This process is for instance applicable to straw and grasses, but especially to agaves, cantula, sicilana, coconut-husks and similar plants. In general the process is also very useful for the treatment of fruit husks, leaves, stems, barks, etc.

In some cases when treating these plants or parts of plants it is adantageous in order to obtain the maximum effect to subject the raw material to a preliminary mechanical or chemical treatment for instance when treating cantala-leaf-fibres, they are beaten or gilled before treatment with alkali.

Example I.—Coirfibres are boiled in a liquid consisting of an aqueous solution of 14.5% NaOH to which is added 0.25% by weight $CuSO_4$ calculated on the raw material and 0.1% by weight $NH_4Cl$ calculated on the raw material.

The boiling is continued for ½–1½ hours after which the intercellular substance is loosened and removed from the alkali solution. After washing with a weak alkali solution the fibrous mass is dipped into stearic acid or an emulsion of stearic acid of about 10% strength. After this the fibres are dried which should take place preferably at about 35° C. Quick drying or drying at an elevated temperature is injurious to the product.

Example II.—Cantala-fibres which have been subjected to a preliminary mechanical treatment in a beating machine or decorticator are boiled in a liquid consisting of an aqueous solution of 2.5% NaOH, to which is added 0.25% by weight $CuSO_4$ calculated on the raw material and 0.1% by weight $NH_4Cl$ calculated on the raw material.

The boiling is continued for about ½ hour after which the mass without washing out the alkali solution, is treated for 2 hours with a solution or emulsion of fatty acids derived from cocoanut oil of 2% strength.

Example III.—Cantala-fibres are treated as in Example 2 but instead of an emulsion or solution of 2% fatty acid a 50% emulsion of fatty-acid derived from cocoanut oil in water is used. The fibres so obtained are of a softer nature and have a better colour.

In the continuous process the concentration of the alkali solution is kept constant as nearly as possible and also the other chemicals are added as their concentration is diminished.

The duration of the alkali treatment is generally speaking substantially in inverse proportion with the concentration. It has been found that in the preparation of straw a treatment for one half hour with a 20% alkali solution suffices whilst with a 10–12% lye about 1½ hours is advantageously used. The freshness of the material treated may also be considered as regards the duration of the treatment with the alkali solution.

When treating material having other than flaxy or straw-like qualities, for instance, cocoanut husks, a 20% solution of sodium hydroxide is advantageously used, whilst in treating flax good results are obtained with a solution of about 0.25%.

As already stated according to my invention not only a more supple and elastic product is obtained than hitherto, but also good quality fibres are obtained from materials which for this purpose were hitherto inaccessible, whilst a separate bleaching is unnecessary.

In the appended claims, by the expression "substance capable of reacting with the alkali solution to form a soap", I mean to include soap forming fatty acids and fats which on treatment with alkalies liberate soaps.

I claim:

1. In the caustic alkali process of preparing spinnable fibres from vegetable raw material, the step which comprises treating the fibres while wet with alkali solution with a substance capable of reacting with the alkali solution to form a soap.

2. In the caustic alkali process of preparing spinnable fibres from vegetable raw material, the step which comprises treating the fibres while wet with alkali solution with a soap forming fatty acid.

3. In the caustic alkali process of preparing spinnable fibres from vegetable raw material, the step which comprises treating the fibres while wet with alkali solution with fatty acids derived from cocoanut oil.

4. The process of preparing spinnable fibres from vegetable raw material which comprises subjecting the crude and loosened fibres to the action of a caustic alkali solution and thereafter treating the fibres, without removing the adhering alkali solution, with a substance capable of reacting with the adhering alkali solution to form a soap.

5. The process of preparing spinnable fibres from vegetable raw material which comprises subjecting the crude loosened fibres to the action of a caustic alkali solution and thereafter treating the fibres, without removing the adhering alkali solution, with a soap forming fatty acid.

6. The process as in claim 5 in which the fatty acid is one derived from cocoanut oil.

7. The process of preparing spinnable fibres from vegetable raw material which comprises subjecting the crude and loosened fibres to the action of a caustic alkali solution containing small amounts of copper sulphate and nickel sulphate as a catalyst and thereafter treating the fibres, without removing the adhering alkali solution, with a soap forming fatty acid.

In testimony whereof I affix my signature.

JOHANNES CLAZINUS MARIE van DIGGELEN.